US012762848B2

(12) United States Patent
Qualmann et al.

(10) Patent No.: US 12,762,848 B2
(45) Date of Patent: Oct. 13, 2026

(54) DEVICE AND METHOD FOR TRAINING A CONTROL POLICY FOR MANIPULATING AN OBJECT

(71) Applicant: Robert Bosch GmbH, Stuttgart (DE)

(72) Inventors: Alexander Qualmann, Schoenaich (DE); Anh Vien Ngo, Nehren (DE); Bao Huy Le, Tübingen (DE); Miroslav Gabriel, Munich (DE); Philipp Christian Schillinger, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 52 days.

(21) Appl. No.: 18/931,409

(22) Filed: Oct. 30, 2024

(65) Prior Publication Data

US 2025/0196362 A1 Jun. 19, 2025

(30) Foreign Application Priority Data

Dec. 15, 2023 (EP) .................................... 23217232

(51) Int. Cl.

| | |
|---|---|
| ***B25J 9/16*** | (2006.01) |
| ***G06T 7/50*** | (2017.01) |
| ***G06T 7/70*** | (2017.01) |
| ***G06T 11/60*** | (2006.01) |
| ***G06V 20/70*** | (2022.01) |

(52) U.S. Cl.

CPC ............... *B25J 9/1697* (2013.01); *G06T 7/50* (2017.01); *G06T 7/70* (2017.01); *G06T 11/60* (2013.01); *G06V 20/70* (2022.01); *G06T 2207/20081* (2013.01); *G06T 2207/20084* (2013.01)

(58) Field of Classification Search

CPC .......... B25J 9/1697; B25J 9/163; B25J 13/00; G06T 7/50; G06T 7/70; G06T 11/60; G06T 2207/20081; G06T 2207/20084; G06V 20/70; G06V 10/774; G05B 2219/39271; G05B 2219/40499; G09B 25/02

USPC .......................................................... 700/259

See application file for complete search history.

(56) References Cited

U.S. PATENT DOCUMENTS

| | | | | |
|---|---|---|---|---|
| 11,403,811 | B1 * | 8/2022 | Upchurch | G06T 15/50 |
| 11,443,178 | B2 * | 9/2022 | Edwards | G06N 3/094 |
| 2021/0142479 | A1 * | 5/2021 | Phogat | G06T 7/11 |
| 2022/0016766 | A1 | 1/2022 | Humayun et al. | |
| 2022/0108132 | A1 * | 4/2022 | Zhang | G06F 18/2148 |
| 2022/0156585 | A1 * | 5/2022 | Leng | G06F 18/2155 |

(Continued)

OTHER PUBLICATIONS

Feldman et al., "A Hybrid Approach for Learning to Shift and Grasp with Elaborate Motion Primitives," 2022 IEEE International Conference on Robotics and Automation (ICRA), 2022, pp. 6365-6371.

*Primary Examiner* — B M M Hannan

(74) *Attorney, Agent, or Firm* — Norton Rose Fulbright US LLP

(57) ABSTRACT

A method for training a control policy for manipulating an object. For each of one or more objects in each of one or more scenes, receiving an input data element including image data representing a shape of the object to be manipulated and its position in the scene, generating, for each input data element, one or more training data elements by generating augmentations of the image data and pseudo-labels for the augmented image data according to a semi-supervised learning scheme and training the control policy using the generated training data elements.

9 Claims, 3 Drawing Sheets

(56) References Cited

U.S. PATENT DOCUMENTS

| | | | | |
|---|---|---|---|---|
| 2022/0375210 | A1* | 11/2022 | Ngo | G06V 20/52 |
| 2023/0376846 | A1* | 11/2023 | Takemori | G06F 17/16 |
| 2024/0096077 | A1* | 3/2024 | Luo | G06N 3/045 |

* cited by examiner

DEVICE AND METHOD FOR TRAINING A CONTROL POLICY FOR MANIPULATING AN OBJECT

CROSS REFERENCE

The present application claims the benefit under 35 U.S.C. § 119 of European Patent Application No. EP 23 21 7232.0 filed on Dec. 15, 2023, which is expressly incorporated herein by reference in its entirety.

FIELD

The present invention relates to devices and methods for training a control policy for manipulating an object.

BACKGROUND INFORMATION

A core task in robotic manipulation is grasping, a fundamental skill that opens doors to more complex actions like pick and placing or bin picking. In bin picking, the goal is to take objects out of a container and put them in specific places, which has wide applications. However, bin picking is challenging due to issues like noisy perception, object obstructions, and collisions in planning. Thus, there is a need for a robust approach to handle this task effectively. Modern grasping techniques are often based on deep learning methods which empower the respective machine learning model to predict grasping actions without relying on predefined models, thereby making them applicable to a broad spectrum of objects in unstructured environments. However, typical approaches depend on supervised learning and offline training, potentially limiting their ability to adapt to unseen objects or new environmental conditions. Therefore, approaches are desirable which allow efficient online grasp (or generally manipulation) learning.

According to various embodiments of the present invention, a method for training a control policy (represented by a machine learning model, i.e., training the control policy comprises training a machine learning model) for manipulating an object is provided, comprising

- for each of one or more objects in each of one or more scenes, receiving an input data element including image data representing a shape of the object to be manipulated and its position in the scene;
- generating, for each input data element, one or more training data elements by generating augmentations of the image data and pseudo-labels for the augmented image data according to a semi-supervised learning scheme; and
- training the control policy using the generated training data elements (and possibly other training data elements, in particular those including the received input data elements without augmentation and for example including observed rewards (and thus observed labels rather than pseudo-labels)).

The method described above allows addressing the issue of sparse reward feedback in online grasp learning and, by using unlabeled data using semi-supervised learning (SSL) to improve the learning efficiency. Various SSL methods can be integrated into reinforcement learning, e.g., Convolutional Soft Actor-Critic (ConvSAC) to arrive at a scheme denoted as SSL-ConvSAC herein. In particular, curriculum learning-based SSL methods may be used.

This allows addressing the extreme imbalance issue between the amount of labelled and unlabeled data that typically occurs in grasping (and similar) applications and which may cause online-training to diverge.

Manipulation can in particular mean grasping and picking up (e.g., gripping or also sucking in the case of a suction pad). The method can also be applied for other tasks such as turning a key, pressing a button or pulling a lever, etc.

Various examples are described in the following.

Example 1 is a method for training a control policy as described above.

Example 2 is the method of example 1, comprising training the control policy using reinforcement learning.

Usage of a semi-supervised learning scheme in context of reinforcement learning for training a control policy (in other words, an agent) for manipulating an object allows addressing the issue of sparse rewards in such a setting.

Example 3 is the method of example 2, wherein training the control policy comprises training an actor and a critic using the generated training data elements.

Both the actor and the critic may be trained using a respective loss that uses the generated training data elements. Since the generation of the training data elements increases the number of training data elements (in comparison to an approach that uses only training data elements that correspond directly to the input data elements), training using a loss based also on the generated training data elements leads to a loss that covers a wider range of states.

Example 4 is the method of any one of example 1 to 3, wherein training the control policy comprises training a neural network representing the control policy.

Using the generated training data elements, a neural network can be efficiently trained using back-propagation.

Example 5 is the method of any one of examples 1 to 4, wherein, for each generated training data element, a pseudo label is generated for each of a plurality of manipulation poses, wherein each manipulation pose includes a manipulation position corresponding to a respective pixel in the respective augmented image data.

So, for example, dense pseudo-labels are generated which increases data efficiency greatly in comparison to sparse rewards (which are only received for successful manipulation poses).

Example 6 is the method of any one of examples 1 to 5, wherein training the control policy comprises determining a loss (e.g. for each the actor and the critic, wherein the respective machine learning model (e.g. actor and critic or another ML model representing the control policy at least in part) is adapted to reduce the respective loss) including loss terms for the generated training data elements, wherein each loss term is soft-weighted in the loss function by applying a softmax function to a confidence of pseudo-labels of manipulation poses of the respective training data element and/or wherein loss terms are filtered out of the loss function if the confidence of pseudo-labels of manipulation poses of the respective training data elements is below a predetermined threshold.

This allows improving generalization and reducing confirmation bias.

Example 7 is the method of any one of examples 1 to 6, wherein the threshold is a pixel-wise threshold.

This allows further improvement of generalization and reduction of confirmation bias.

Example 8 is a method for controlling a robot device, comprising training a control policy according to any one of examples 1 to 7, receiving, for a scene in which the robot device should be controlled, image data representing the scene and supplying the obtained image data to the control policy and generating a control signal for the robot device according to an output that the control policy generates in response to the obtained image data.

Example 9 is a data processing device (in particular a robot device controller), configured to perform a method of any one of examples 1 to 8.

Example 10 is a computer program comprising instructions which, when executed by a computer, makes the computer perform a method according to any one of examples 1 to 8.

Example 11 is a computer-readable medium comprising instructions which, when executed by a computer, makes the computer perform a method according to any one of examples 1 to 8.

In the figures, similar reference characters generally refer to the same parts throughout the different views. The figures are not necessarily to scale, emphasis instead generally being placed upon illustrating the principles of the present invention. In the following description, various aspects are described with reference to the figures.

DETAILED DESCRIPTION OF EXAMPLE EMBODIMENTS

The following detailed description refers to the the figures that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
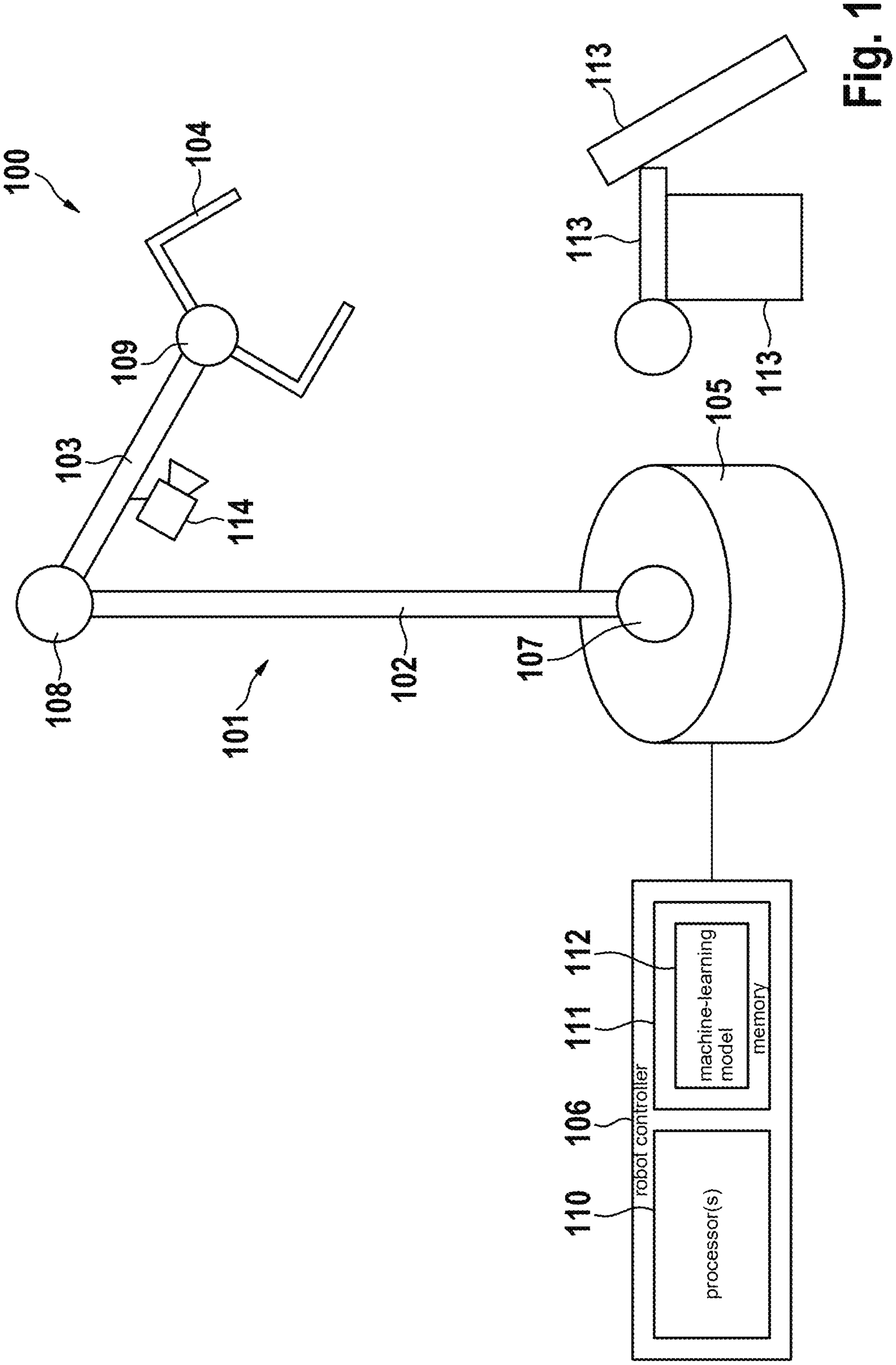
FIG. 1 shows a robot according to an example embodiment of the present invention.

FIG. 1 shows a robot 100.

The robot 100 includes a robot arm 101, for example an industrial robot arm for handling or assembling a work piece (or one or more other objects 113). The robot arm 101 includes manipulators 102, 103, 104 and a base (or support) 105 by which the manipulators 102, 103, 104 are supported. The term "manipulator" refers to the movable members of the robot arm 101, the actuation of which enables physical interaction with the environment, e.g. to carry out a task. For control, the robot 100 includes a (robot) controller 106 configured to implement the interaction with the environment according to a control program. The last member 104 (furthest from the support 105) of the manipulators 102, 103, 104 is also referred to as the end-effector 104 and includes a grasping tool (which may also be a suction gripper).

The other manipulators 102, 103 (closer to the support 105) may form a positioning device such that, together with the end-effector 104, the robot arm 101 with the end-effector 104 at its end is provided. The robot arm 101 is a mechanical arm that can provide similar functions as a human arm.

The robot arm 101 may include joint elements 107, 108, 109 interconnecting the manipulators 102, 103, 104 with each other and with the support 105. A joint element 107, 108, 109 may have one or more joints, each of which may provide rotatable motion (i.e. rotational motion) and/or translatory motion (i.e. displacement) to associated manipulators relative to each other. The movement of the manipulators 102, 103, 104 may be initiated by means of actuators controlled by the controller 106.

The term "actuator" may be understood as a component adapted to affect a mechanism or process in response to be driven. The actuator can implement instructions issued by the controller 106 (the so-called activation) into mechanical movements. The actuator, e.g. an electromechanical converter, may be configured to convert electrical energy into mechanical energy in response to driving.

The term "controller" may be understood as any type of logic implementing entity, which may include, for example, a circuit and/or a processor capable of executing software stored in a storage medium, firmware, or a combination thereof, and which can issue instructions, e.g. to an actuator in the present example. The controller may be configured, for example, by program code (e.g., software) to control the operation of a system, a robot in the present example.

In the present example, the controller 106 includes one or more processors 110 and a memory 111 storing code and data based on which the processor 110 controls the robot arm 101. According to various embodiments, the controller 106 controls the robot arm 101 on the basis of a machine-learning model (e.g. including one or more neural networks) 112 stored in the memory 111.

The machine-learning model may be trained using reinforcement learning (RL), e.g. using actor-critic RL. For example, it may use a fully convolutional network (FCN) to learn dense pixel-wise grasp quality predictions, i.e. to train a critic. The pixel-wise parameterization may also be also used for the grasp primitive, i.e. the actor. However, during online learning, the agent (i.e. the controller 106) only receives sparse feedback of grasp success or failure at only one pixel location (of an input image showing the object to be grasped) that it has selected according to the control policy it uses (i.e. according to the actor). So, for example, the corresponding neural networks (implementing actor and critic) only get updated through back-propagation via the respective losses at this single pixel point.

Therefore, according to various embodiments, an approach is provided that is able to take advantage of back-propagation via the whole pixel points of an input image. In particular, according to various embodiments, the advantage of semi-supervised learning (SSL) and RL-based online grasp learning are combined. The pixel point with reward feedback is used as labelled data, while the remaining pixels without reward feedback are considered as unlabeled data but (by generating pseudo-labels for them) exploited using semi-supervised learning to improve the training and overall performance.

For example, an SSL-based fully Convolutional Soft-Actor Critic (SSL-ConvSAC) is used that combines both true rewards and pseudo-labelled rewards for grasp policy learning.

Various embodiments including a SSL-ConvSAC scheme are described in the following in detail for online grasp learning in a bin-picking application.

Specifically, given an RGB-D (i.e. colour plus depth) image $I \in \mathbb{R}^{H \times W \times 4}$ of a scene (e.g. of the workspace of the robot 100), a grasping policy $\pi$ (represented by a neural network of the machine learning model 112) should be learned. The grasping policy π (control policy in general) is a mapping from the image space to an output map space $R^{H\times W\times 4}$ that ideally maximizes the long-term total grasp success rate. For an image I, the grasping policy output (action map) is a multi-channel map of pixel-wise 1-dimensional grasp quality Q and pixel-wise 3-dimensional grasp configurations A, e.g. representing gripper rotation via Euler angles. The controller 106 may then select the action (i.e. grasp location) having the best grasp quality $(h^*,w^*)=\arg\max_{h',w'}Q[h',w']$, extract the grasp configuration for this grasp location from the action map as $A[h^*,w^*]$ and control the robot arm 101 accordingly to grasp the object 113. After each grasp attempt (index t), the reward $r_t$ is 1 if it succeeds in picking an object, otherwise 0. The goal is to optimize the policy π to maximize the total grasp success return $\Sigma_t r_t$. For each input image, the reward feedback $r_t$ is only associated with the selected grasp, i.e. at pixel $(h^*,w^*)$, while other pixel locations $\{h,w\}_{(h,w)\in H\times W,(h,w)\neq(h^*,w^*)}$ do not obtain reward feedback (i.e. are not labelled by the reward $r_t$). Thus, there is only sparse reward feedback with an extremely unbalanced ratio between labelled data (only the selected grasp location) and unlabeled data (all other grasp locations). To improve data efficiency, according to various embodiments, an approach is used which exploits both data with reward feedback at $(h^*,w^*)$ and without reward feedback at $\{h,w\}_{(h,w)\in H\times W,(h,w)\neq(h^*,w^*)}$. This approach can be seen to be based on the synergy between pseudo-labelling for semi-supervised learning and reinforcement learning.

The online grasp learning problem can be formulated as a Markov decision process (MDP) given by a tupel (S, A, P, R), where S is the state space, A is the action space, P is the transition probability function, and R is the reward function. In each control step, a state is observed, an action is taken according to the control policy and a reward is received from the environment. A subsequent state follows according to the transition probability function.

Figure 2:
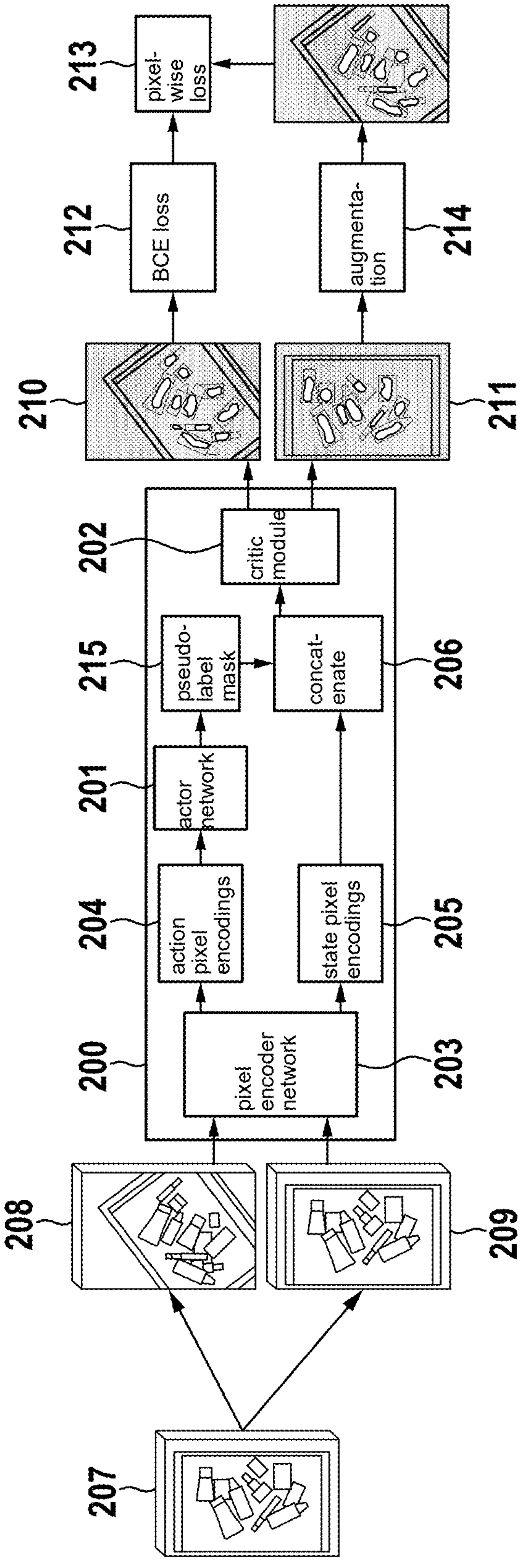
FIG. 2 illustrates SSL-based fully convolutional Soft-Actor-Critic (SSL-ConvSAC) according to an example embodiment of the present invention.

FIG. 2 illustrates SSL-based fully convolutional Soft-Actor-Critic (SSL-ConvSAC) according to an embodiment.

A machine learning model 200 (e.g. corresponding to the machine learning model 112) includes a fully convolutional neural network (FCN) (e.g. with the architecture used by ConvSAC and HACMan (Hybrid Actor-Critic Maps for Manipulation)) as an actor network 201 to infer the dense grasp configuration map $A_\phi(s)$ and as a critic network 202 to approximate the dense grasp quality map $Q_\theta(s, A_\phi(s))$. The machine learning model 200 infers an embedding for each pixel location of an input state s using a pixel encoder network 203 generating action pixel encodings 204 and state pixel encodings 205. The actor 201 convolves over the action pixel encodings 204 and infers a grasp configuration for each pixel. The output of the actor 201 is for example pixel-wise Gaussian distribution, wherein the mean is the predicted (i.e. inferred) grasp orientation at a respective pixel and its variance is uncertainty used for exploration in learning. Actions (i.e. grasp orientations; the location of an action is computed by transformation of the respective pixel location to world coordinate) are concatenated 206 with their corresponding state pixel embedding and evaluated by the critic module 202 resulting in the dense grasp Q-value map.

The state s is represented by 7-dimensional input data that is composed of a colour image, a normal surface map, and a height map, i.e. the t-th state is a triple $s_t=(I_c, I_n, I_d)_t$ with $I_C\in\mathbb{R}^{H*W*3}$, $I_n\in\mathbb{R}^{H*W*3}$ and $I_d\in\mathbb{R}^{H*W*1}$. Each state is for example captured by a stereo sensor with a top-down view of the respective object bin. For a RL-based grasp learning approach, a replay buffer of samples $\{s_t, a_t, r_t\}$ is maintained where $a_t=A_t[h_t, w_t]$ is an action at the single selected (and thus labelled) pixel $(h_t, w_t)$.

Using the labelled pixels, the critic and actor networks may be updated by formulating the critic loss formulated as a classification task with reward labels $r\in\{0, 1\}$ denoting grasp failure and success, respectively. The critic uses for example a binary cross-entropy (BCE) loss and the episode horizon terminates after each grasp attempt. Specifically, the critic and actor losses for the labelled pixels as follows:

$$\mathcal{L}^l_{critic} = BCE(Q_t(s_t, a_t), r_t) \qquad (1)$$
$$\mathcal{L}^l_{actor} = \alpha\log\pi(a_t \mid s_t) - Q_t(s_t, a_t),$$

where α is an entropy regularization coefficient.

It should be noted that this update back-propagates the loss through only one pixel $(h_t, w_t)$ at both the dense grasp quality map Q and action map A.

Specifically, for each input image the amount of labelled data is only $N_l=1$ while the amount of unlabeled data is $N_u=(H\times W)-1$ is the remaining state pixels. This setting is due to the fact that rearranging the scene to the previous state in order to collect grasp samples at other pixel locations can result in a different state in a real-world setup. The approach provided according to various embodiments allows handling a realistic setting where online learning operates on an industrial picking cell without interruption.

According to various embodiments, as mentioned above, this problem of sparse reward feedback (and thus having a small set of labelled data, and a large set of unlabeled data) in RL-based online grasp learning is addressed by means of semi-supervised learning.

According to various embodiments, as described in more detail in the following, SSL techniques such as FixMatch and curriculum learning-based SSL such as FlexMatch and FreeMatch are applied to the online grasp learning problem, i.e. integrated as the SSL in the SSL-ConvSAC, for example. According to another embodiment, a contextual curriculum learning-based SSL is used.

SSL-ConvSAC uses consistency regularization for SSL to rewrite the losses of the actor $A_\phi$ and the critic $Q_\theta$. The critic 201 and the actor 202 are updated using a joint objective based on labelled and unlabeled data. The updates using labelled data are defined in equation (1). The updates using unlabeled data are given by equation (2), given a data sample (s, a, r) where action a encodes labelled pixel (h,w) with reward r while unlabeled pixels are $U=\{h',w'\}_{(h',w')\in H\times W,(h',w')\neq(h,w)}$:

$$\mathcal{L}^u_{critic} = \frac{1}{N_u}\lambda(\hat{Q}; U)BCE(\hat{Q}, Q(\hat{s}, \pi(\hat{s}))) \qquad (2)$$
$$\mathcal{L}^u_{actor} = \frac{1}{N_u}\lambda(\hat{Q}; U)(\alpha\log\pi(A \mid \hat{s}) - Q(\hat{s}, \pi(\hat{s})))$$

where $\hat{s}=\Omega(s)$ denotes a strongly-augmented input (in particular image) data 208 given input data 207. Pixel-wise (hard) pseudo labels $\hat{Q}$ 211 are computed by $\hat{Q}=\mathbb{1}(Q(\omega(s), \pi(\omega(s))>0.5)$, where $\omega(s)$ is weakly-augmented input data 209, i.e. a training data element generated by applying a weak augmentation to the input s. Further, for the strongly-augmented input data $\hat{s}=\Omega(s)$, a grasp quality map $Q(\Omega(s), \pi(\Omega(s)))$ 210 and an action map $\pi(\Omega(s))$ are computed. The weight $\lambda(\hat{Q}; U)\in R^{H*W}$ is a pixel-wise weighting function that can be defined differently according to a various choices of an SSL method. The conditioning on U means that only unlabeled pixels matters in this operation, i.e. $\lambda(\hat{Q}; U)$ has a zero value at the chosen pixel (h,w) and values in range [0, 1] at other pixels.

It should be noted that according to various embodiments, the SSL objective includes computation of the pixel-wise loss 213 (including BCE loss, e.g. with no reduction, and for example applying augmentation 214 to the pseudo labels (i.e. pseudo label map) 211 to make them correspond to the strongly-augmented input (image) data 210 to calculate the BCE loss 212), enabling it to be determined utilizing parallel computations in fully convolutional networks to process the loss for all $N_u$ unlabeled data points simultaneously.

As a result, the joint objectives of the actor and critic are $$\mathcal{L}_{critic} = \mathcal{L}^{l}_{critic} + \mathcal{L}^{u}_{critic}$$

and $$\mathcal{L}_{actor} = \mathcal{L}^{l}_{actor} + \mathcal{L}^{u}_{actor},$$

respectively.

The SSL objective for unlabeled data is computed in pixel-wise manner, therefore the final loss is then a sum of losses over all pixels. It should be noted that whenever there are arg max or max operations on a grasp quality map $Q \in R^{H\times W}$, it is implicitly assumed that $Q \in R^{H\times W\times 2}$ for binary classes, specifically, Q[.,., 1]=Q which is the Q-value for class success and Q[.,., 0]=1.0−Q for class failure. Further, arg max or max operations are applied across the last axis (i.e. over whether there is grasp success or failure).

It should further be noted that there may be a pseudo-label mask 215 (for pseudo-labeled pixels) which is used in the actor loss, i.e. the actor loss is only backpropagated at pixels where there are pseudo-labels.

In the following, multiple options for the used SSL scheme in SSL-ConvSAC are described.

1) FixMatch-Based SSL-ConvSAC

A first option is to leverage FixMatch for SSL-ConvSAC. For this, a constant threshold $\tau$ is defined based on which pseudo-labels with high confidence will be retained. In particular, the weighting function is computed as follows $$\lambda(\hat{Q}_t; U_t) = \mathbb{1}(\max(\hat{Q}_t) \geq \tau) \tag{3}$$

2) Curriculum-Based SSL-ConvSAC

For example, one of the two curriculum-based SSL frameworks FlexMatch and FreeMatch may be used. Instead of using a fixed constant threshold $\tau$, FlexMatch and FreeMatch introduce curriculum learning to tune $\tau$ in order to control the way pseudo labels from individual class are retained. The main idea can be seen in that a high threshold filters out noisy pseudo labels and leaves only high quality ones. An adaptive threshold that can be used for re-computing the weighting function specifically for each class c is calculated as follows:

$$\lambda_t(\hat{Q}_t; U_t) = \mathbb{1}(\max(\hat{Q}_t) \geq \tau_t(\operatorname{argmax}\hat{Q}_t)) \tag{4}$$

where $\tau_t$ is adapted according to curriculum learning.

a) FlexMatch-Based SSL-ConvSAC

According to Flexmatch, a model learning effect $\sigma_t(c)$, $c \in \{0, 1\}$ is defined at each training step t, with classes with fewer samples having their prediction confidence reach the threshold is considered to have a greater learning difficulty or a worse learning status. Assuming that the size of the replay buffer to be $|B|$, then the total number of unlabeled pixels is $N_u \times |B|$. The learning effect is computed as follows $$\sigma_t(c) = \sum_{s\in B}\sum_{n=1}^{N_u} \mathbb{1}(\max Q(\omega(s), \pi(\omega(s)) > \tau) \cdot \mathbb{1}(\operatorname{argmax} Q(\omega(s), \pi(\omega(s)) = c). \tag{5}$$

Here (as in most cases), the operation inside the identity function is pixel-wise. The summation takes sum over all unlabeled pixels and across samples in the replay buffer. As a result, the adaptive threshold $\tau_t(c)$ can now be computed by normalizing $\sigma_t(c)$ in the range [0, 1] as follows:

$$\beta_t(c) = \frac{\sigma_t(c)}{\max_c \sigma_t}, \ \tau_t(c) = \beta_t(c) \cdot \tau, \tag{6}$$

where the normalized learning effect $\beta_t(c)$ is equal to 1 for the best-learned class and lower for the hard classes. A warm-up process and a non-linear mapping function from FlexMatch may be applied to enable the thresholds to have a non-linear increasing curve in the range from 0 to 1.

b) FreeMatch-Based SSL-ConvSAC

Instead of adjusting the confidence threshold according to only the current step's information as in FlexMatch, FreeMatch includes self-adapting this value according to the model learning progress. In particular, a self-adaptive global threshold is computed as in equation (7) to track the overall learning status globally across all classes among unlabeled data:

$$\tau_t^{global} = \alpha \tau_{t-1}^{global} + (1-\alpha)\frac{1}{N_u|B|}\sum_{s\in B}\sum_{n=1}^{N_u} \max q_s, \tag{7}$$

with t>1 and $$\tau_0^{global} = 1/2$$

(as the number of classes is 2, i.e. success or failure), where $q_s = Q(\omega(s), \pi(\omega(s))$ and $\alpha \in (0, 1)$ is the momentum decay of the exponential moving average of the confidence. A self-adaptive local threshold to adjust the global threshold in a class-specific fashion is computed as follows:

$$\tilde{p}_t(c) = \alpha \tilde{p}_{t-1}(c) + (1-\alpha)\frac{1}{N_u|B|}\sum_{s\in B}\sum_{n=1}^{N_u} q_s(c), \tag{8}$$

with t>0 and $\tilde{p}_0 = \frac{1}{2}$. As a result, the final adaptive threshold for each individual class is computed as $$\tau_t(c) = \frac{\tilde{p}_t(c)}{\max\{\tilde{p}_t(\text{success}), \tilde{p}_t(\text{failure})\}} \cdot \tau_t^{global} \tag{9}$$

FreeMatch's fairness regularization may or may not be used.

3) Contextual Curriculum-Based SSL-ConvSAC

The above SSL-ConvSAC variants mainly leverage existing SSL methods to the soft-actor critic framework and to the pixel-wise grasp prediction. The main challenge in this setting in comparison to standard SSL can be seen in the extreme imbalance between labelled and unlabeled data as aforementioned. This may quickly lead to the confirmation bias problem. Most SSL methods can suffer from this problem if the mini-batches contain a ratio of 1:100 between labelled vs. unlabeled data. According to various embodiments, three measures (or at least one or two of them) are taken to improve generalization and reduce confirmation bias as described in the following. In particular, the confidence of the machine learning model is reduced:

1) Lower-bounded confidence threshold: This helps to filter 212 pseudo labels with low-confidence for curriculum-based methods. In particular, a lower-bound of the adaptive threshold is introduced by setting $\mathcal{T}_t=\max\{\mathcal{T}_t, \mathcal{T}_{lb}\}$, where $\tau_{lb}$ is a predefined lower-bound confidence threshold, to filter out too low confidence labels, e.g. if letting the threshold $\mathcal{T}_t$ to be too small.

2) Soft-weighting function: The hard-weighting $\lambda_t$ in equation (4) treats pseudo labels of both low and high confidence equally as long as their confidence is above the threshold. According to various embodiments, soft-weighting via a soft-max function is used instead:

$$\lambda_t(\hat{Q}_t; U_t) \propto \exp(\hat{Q}_t[\mathbb{1}_t])$$

$$\text{where } \mathbb{1}_t = \mathbb{1}(\max(\hat{Q}_t) \geq \tau_t(\text{argmax}\hat{Q}_t))$$

The arguments of the argmax are the classes 0, 1. That means Tt returns the pixel-wise threshold for the argmax class 0 or 1.

3) Contextual Curriculum-Based Learning

The previous SSL-ConvSAC variants compute thresholds adaptively to each class, i.e. in FlexMatch- and FreeMatch-based SSL-ConvSAC and the values $\sigma_t$, $\beta_t$, $\mathcal{T}_t$, $\tilde{p}_t$ are 2-dimensional. However, it can be observed that different pixel locations in an input image, though having the same class, e.g. success, their grasp quality values are not necessarily identical, e.g. depending on object points of different material and varying surface curvature. Therefore, according to various embodiments, $\sigma_t$, $\beta_t$, $\mathcal{T}_t$, $\tilde{p}_t \in \mathbb{R}^{H\times W\times 2}$ are determined to depend on pixel contexts. Specifically, the calculations of equations (5), (7) and (8) are replaced by pixel-wise versions as follows:

$$\sigma_t(c) = \sum_{s\in B} \mathbb{1}(\max Q(\omega(s), \pi(\omega(s)) > \tau) \cdot \mathbb{1}(\text{argmax} Q(\omega(s), \pi(\omega(s)) = c). \quad (10)$$

$$\tau_t^{global} = \alpha\tau_{t-1}^{global} + (1-\alpha)\frac{1}{|B|}\sum_{s\in B} \max q_s,$$

$$\tilde{p}_t(c) = \alpha\tilde{p}_{t-1}(c) + (1-\alpha)\frac{1}{|B|}\sum_{s\in B} q_s(c),$$

The calculations of equations (6) and (9) are done in a pixel-wise manner, too. As a result, the weighting function in equation (4) involves fully pixel-wise terms.

The weak and strong augmentations include for example one or more of the following i) Colour transformation, which includes auto-contrast, brightness, contrast, equalize, posterize, sharpness, and/or solarize;

ii) Geometric transformation: rotation and shift operations that alter the information about normal vectors in the sevenchannel image;

iii) Application of a noise operator: uniform noise and binary noise.

For example, colour transformation is applied on RGB channels, uniform noise on the depth channel, binary noise on normal vectors channels, and geometric transformation on the whole seven channels. For weakly augmentation, set random rotation is for example in [−10, 10] degree, and random shifting is [−10, 10] pixels, and there is colour jittering on the RGB channels. For strong augmentation, random rotation is for example in the range [−180, 180] degree and random shifting shifting in [−30, 30] pixels on the whole seven channels. Uniform noise of 5 mm range for the depth channel, und 10% zero out in normal vectors are for example used.

Figure 3:
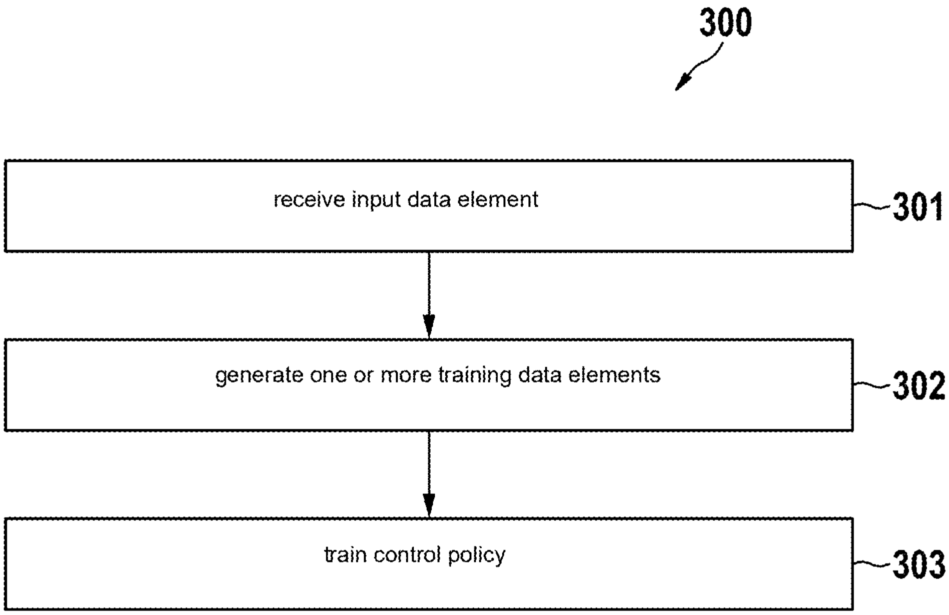
FIG. 3 shows a flow diagram illustrating a method for training a control policy for manipulating an object, according to an example embodiment of the present invention.

In summary, according to various embodiments, a method is provided as illustrated in FIG. 3.

FIG. 3 shows a flow diagram 300 illustrating a method for training a control policy (represented by a machine learning model, i.e. training the control policy comprises training a machine learning model) for manipulating an object.

In 301, for each of one or more objects in each of one or more scenes, an input data element is received (from one or more sensors and/or a sensor fusion device) including image data representing a shape of the object to be manipulated and its position in the scene.

In 302, for each input data element, one or more training data elements are generated by generating augmentations of the image data and pseudo-labels for the augmented image data according to a semi-supervised learning scheme.

In 303, the control policy is trained using the generated training data elements (and possibly other training data elements, in particular those including the received input data elements without augmentation and for example including observed rewards (and thus observed labels rather than pseudo-labels)).

Various embodiments may receive and use image data (i.e. digital images) from various visual sensors (cameras) such as video, radar, LiDAR, ultrasonic, thermal imaging, motion, sonar etc., for example as a basis for obtaining the input data (representing the respective states). It should be noted that image data may be colour (e.g. RGB images) or black and white or greyscale images but the term "image data" is herein understood to also include other "dense" data (i.e. data which has one or more values (one per channel) for each of an array of pixels) such as a height map, depth image or normal surface map.

For example, the modalities RGB and depth are captured by a stereo sensor with a top-down view of an object bin. Each control action corresponds for example to a three-dimensional orientation represented by Euler angles ($\alpha_t$, $\beta_t$, $\gamma_t$) and Cartesian coordinates ($x_t$, $y_t$, $z_t$) which are defined as the final grasp pose and position of, e.g. a suction gripper with respect to the robot coordinate origin, e.g. the base link of a robot arm. In this way, a grasp action may be defined as $a_t=(x_t, y_t, \alpha_t, \beta_t)$ since $z_t$ can be directly extracted from a height map and $\gamma_t$ is unnecessary for an axisymmetric suction gripper. The reward $r_t$ is 1 when a successful grasp is executed or otherwise is treated as 0.

The approach of FIG. 3 may for example used to provide new exploration strategies for online learning in bin-picking. A policy network is for example used that maps from an RGB-D image to a pixel-wise grasp map that predicts both grasp quality (from 0: least graspable to 1: most graspable) and grasp configuration (gripper orientation) at every pixel. The approach of FIG. 3 may for example be used to provide exploration strategies to better learn or adapt to new scene settings with respect to a new object portfolio, camera settings and bin settings.

The control policy may be used to control a robot device (i.e. to generate a control signal for a robot device). Robot device may be understood as any technical system (with a mechanical part whose movement is controlled), like e.g. a computer-controlled machine, like a robot, a vehicle, a domestic appliance, a power tool, a manufacturing machine, a personal assistant or an access control system. According to various embodiments, a policy for controlling the technical system may be learnt and then the technical system may be operated accordingly.

The method of FIG. 3 may be performed by one or more data processing devices (e.g. computers or microcontrollers) having one or more data processing units. The term "data processing unit" may be understood to mean any type of entity that enables the processing of data or signals. For example, the data or signals may be handled according to at least one (i.e., one or more than one) specific function performed by the data processing unit. A data processing unit may include or be formed from an analogue circuit, a digital circuit, a logic circuit, a microprocessor, a microcontroller, a central processing unit (CPU), a graphics processing unit (GPU), a digital signal processor (DSP), a field programmable gate array (FPGA), or any combination thereof. Any other means for implementing the respective functions described in more detail herein may also be understood to include a data processing unit or logic circuitry. One or more of the method steps described in more detail herein may be performed (e.g., implemented) by a data processing unit through one or more specific functions performed by the data processing unit.

Accordingly, according to one embodiment, the method is computer-implemented.

What is claimed is:

1. A method for training a control policy for manipulating an object, comprising the following steps:
- for each of one or more objects in each of one or more scenes:
  - receiving an input data element including image data representing a shape of the object to be manipulated and a position of the object in the scene;
  - generating, for each input data element, one or more training data elements by generating augmentations of the image data and pseudo-labels for the augmented image data according to a semi-supervised learning scheme; and
  - training the control policy using the generated training data elements;
  - wherein the training of the control policy includes determining a loss including loss terms for the generated training data elements, wherein: (i) each loss term is soft-weighted in a loss function by applying a softmax function to a confidence of pseudo-labels of manipulation poses of a respective training data element of the generated training data elements and/or (ii) loss terms are filtered out of the loss function when the confidence of pseudo-labels of manipulation poses of respective training data elements of the generated training data elements is below a predetermined threshold.

2. The method of claim 1, further comprising training the control policy using reinforcement learning.

3. The method of claim 2, further comprising training the control policy using actor-critic reinforcement learning and wherein training the control policy includes training an actor and a critic using the generated training data elements.

4. The method of claim 1, wherein the training of the control policy includes training a neural network representing the control policy.

5. The method of claim 1, wherein, for each generated training data element, a pseudo label is generated for each of a plurality of manipulation poses, wherein each manipulation pose includes a manipulation position corresponding to a respective pixel in the respective augmented image data.

6. The method of claim 1, wherein the threshold is a pixel-wise threshold.

7. A method for controlling a robot device, comprising the following steps:
- training a control policy for manipulating an object by:
  - for each of one or more objects in each of one or more scenes:
    - receiving an input data element including image data representing a shape of the object to be manipulated and a position of the object in the scene,
    - generating, for each input data element, one or more training data elements by generating augmentations of the image data and pseudo-labels for the augmented image data according to a semi-supervised learning scheme, and
    - training the control policy using the generated training data elements,
    - wherein the training of the control policy includes determining a loss including loss terms for the generated training data elements, wherein: (i) each loss term is soft-weighted in a loss function by applying a softmax function to a confidence of pseudo-labels of manipulation poses of a respective training data element of the generated training data elements and/or (ii) loss terms are filtered out of the loss function when the confidence of pseudo-labels of manipulation poses of respective training data elements of the generated training data elements is below a predetermined threshold;
- receiving, for a scene in which the robot device should be controlled, further image data representing the scene; and
- supplying the obtained further image data to the control policy and generating a control signal for the robot device according to an output that the control policy generates in response to the obtained further image data.

8. A data processing device, configured to train a control policy for manipulating an object, the data processing device configured to:
- for each of one or more objects in each of one or more scenes:
  - receive an input data element including image data representing a shape of the object to be manipulated and a position of the object in the scene;
  - generate, for each input data element, one or more training data elements by generating augmentations of the image data and pseudo-labels for the augmented image data according to a semi-supervised learning scheme; and
  - train the control policy using the generated training data elements;

wherein the training of the control policy includes determining a loss including loss terms for the generated training data elements, wherein: (i) each loss term is soft-weighted in a loss function by applying a softmax function to a confidence of pseudo-labels of manipulation poses of a respective training data element of the generated training data elements and/or (ii) loss terms are filtered out of the loss function when the confidence of pseudo-labels of manipulation poses of respective training data elements of the generated training data elements is below a predetermined threshold.

9. A non-transitory computer-readable medium on which is stored a computer program including instructions for training a control policy for manipulating an object, the instructions, when executed by a computer, causing the computer to perform the following steps:

for each of one or more objects in each of one or more scenes:

receiving an input data element including image data representing a shape of the object to be manipulated and a position of the object in the scene;

generating, for each input data element, one or more training data elements by generating augmentations of the image data and pseudo-labels for the augmented image data according to a semi-supervised learning scheme; and training the control policy using the generated training data elements;

wherein the training of the control policy includes determining a loss including loss terms for the generated training data elements, wherein: (i) each loss term is soft-weighted in a loss function by applying a softmax function to a confidence of pseudo-labels of manipulation poses of a respective training data element of the generated training data elements, and/or (ii) loss terms are filtered out of the loss function when the confidence of pseudo-labels of manipulation poses of respective training data elements of the generated training data elements is below a predetermined threshold.

* * * * *